US011654640B1

(12) United States Patent
Wightman et al.

(10) Patent No.: US 11,654,640 B1
(45) Date of Patent: May 23, 2023

(54) FEEDBACK SYSTEM AND METHOD FOR AUTOMATICALLY ADJUSTING AND CONTROLLING INFRARED HEATING OF PARTS

(71) Applicant: Dukane IAS, LLC, St. Charles, IL (US)

(72) Inventors: Tyler James Wightman, St. Charles, IL (US); Joshua Matthew Franklin, St. Charles, IL (US); Christopher Lee James, St. Charles, IL (US)

(73) Assignee: Dukane IAS, LLC, St. Charles, IL (US)

( * ) Notice: Subject to any disclaimer, the term of this patent is extended or adjusted under 35 U.S.C. 154(b) by 0 days.

(21) Appl. No.: 17/666,647

(22) Filed: Feb. 8, 2022

(51) Int. Cl.

| | |
|---|---|
| ***B29C 65/00*** | (2006.01) |
| ***H05B 3/00*** | (2006.01) |
| ***G01J 5/48*** | (2022.01) |
| ***B29C 65/24*** | (2006.01) |
| ***H05B 1/02*** | (2006.01) |
| ***G06V 10/25*** | (2022.01) |
| ***H04N 23/60*** | (2023.01) |
| ***H04N 23/90*** | (2023.01) |

(52) U.S. Cl.
CPC ...... *B29C 66/91211* (2013.01); *B29C 65/245* (2013.01); *B29C 66/91221* (2013.01); *B29C 66/91421* (2013.01); *G01J 5/48* (2013.01); *G06V 10/25* (2022.01); *H04N 23/60* (2023.01); *H04N 23/90* (2023.01); *H05B 1/023* (2013.01); *H05B 3/0057* (2013.01)

(58) Field of Classification Search
None
See application file for complete search history.

(56) References Cited

U.S. PATENT DOCUMENTS

| | | | | |
|---|---|---|---|---|
| 6,099,291 | A | 8/2000 | Lanser | |
| 6,283,044 | B1 * | 9/2001 | Apps | B65D 19/0022 108/57.25 |
| 2001/0001697 | A1 * | 5/2001 | Whiting | G03F 7/38 430/30 |
| 2002/0177094 | A1 * | 11/2002 | Shirakawa | H01L 21/67109 432/5 |

(Continued)

FOREIGN PATENT DOCUMENTS

| | | |
|---|---|---|
| JP | S 55103920 A | 8/1980 |

*Primary Examiner* — Jacob T Minskey
*Assistant Examiner* — Caroline Beha
(74) *Attorney, Agent, or Firm* — Nixon Peabody LLP

(57) ABSTRACT

Systems and methods of controlling outputs of infrared heaters used to join a first part to a second part, and a component made thereby. Upper and lower nests hold the first and second parts, respectively. A movable heating platen has infrared heaters on opposite surfaces. Imaging sensors have fields of view encompassing heated portions of the first and second parts, respectively, when the platen is retracted away from an area between the upper and lower nests. A controller causes the upper and lower nests to move while causing the platen to extend into and retract away from the area between the upper and lower nests. The first imaging sensor takes a first image of the heated portions of the first part, which causes an adjustment to be made to an output of the infrared heaters in a subsequent welding cycle.

6 Claims, 7 Drawing Sheets
(1 of 7 Drawing Sheet(s) Filed in Color)

160 162 B2 120 111 164 166

(56) References Cited

U.S. PATENT DOCUMENTS

| | | | | |
|---|---|---|---|---|
| 2006/0278113 | A1* | 12/2006 | Kawagoe | B29C 66/836 101/494 |
| 2009/0101828 | A1* | 4/2009 | Nakata | A61B 6/4488 250/580 |
| 2014/0348692 | A1* | 11/2014 | Bessac | B22F 10/20 419/53 |
| 2015/0273808 | A1 | 10/2015 | Thompson | |
| 2017/0297095 | A1* | 10/2017 | Zalameda | B33Y 10/00 |
| 2019/0202135 | A1* | 7/2019 | Brunnecker | B23K 26/0884 |

* cited by examiner

| | Zone 1 | Zone 2 | Zone 3 | Zone 4 | Zone 5 | Zone 6 | Zone 7 | Zone 8 | Zone 9 | Zone 10 | Zone 11 | Zone 12 |
|---|---|---|---|---|---|---|---|---|---|---|---|---|
| Starting Output | 10.00 | 15.00 | 45.00 | 50.00 | 25.00 | 40.00 | 70.00 | 20.00 | 30.00 | 35.00 | 20.00 | 35.00 |
| Cycle 1 Measured Temperature | 130 | 141 | 150 | 170 | 140 | 160 | 200 | 143 | 145 | 155 | 160 | 150 |
| Cycle 2 Adjusted Output | 14.5 | 18.4 | 47.5 | 50.25 | 28.5 | 41.5 | 67.5 | 23.2 | 33 | 37 | 21.5 | 37.5 |
| Cycle 2 Measured Temperature | 185.50 | 173.96 | 161.33 | 170.85 | 162.60 | 165.00 | 194.86 | 165.80 | 159.50 | 165.86 | 169.00 | 162.71 |
| Cycle 3 Adjusted Output | 13.45 | 18.45 | 48.87 | 50.46 | 29.74 | 42.00 | 65.51 | 23.66 | 34.55 | 37.46 | 21.80 | 38.73 |
| Cycle 3 Measured Temperature | 170.07 | 171.45 | 165.98 | 171.56 | 172.67 | 167.99 | 190.12 | 167.14 | 167.99 | 166.91 | 169.36 | 170.05 |
| Cycle 4 Adjusted Output | 13.70 | 18.63 | 49.32 | 50.63 | 29.86 | 42.35 | 64.00 | 24.05 | 34.90 | 37.86 | 22.08 | 38.98 |
| Cycle 4 Measured Temperature | 173.19 | 175.10 | 165.51 | 175.14 | 171.35 | 169.39 | 185.74 | 171.92 | 166.70 | 169.71 | 168.55 | 171.13 |
| Cycle 5 Adjusted Output | 13.79 | 18.63 | 49.79 | 50.63 | 30.04 | 42.63 | 62.93 | 24.20 | 35.32 | 38.13 | 22.40 | 39.17 |
| Cycle 5 Measured Temperature | 175.33 | 173.10 | 170.10 | 177.14 | 172.40 | 167.51 | 180.62 | 173.02 | 166.68 | 173.90 | 174.01 | 174.98 |
| Cycle 6 Adjusted Output | 13.79 | 18.72 | 50.04 | 50.52 | 30.17 | 43.01 | 62.65 | 24.30 | 35.73 | 38.18 | 22.40 | 39.17 |
| Cycle 6 Measured Temperature | 172.33 | 173.98 | 169.94 | 176.77 | 174.14 | 171.98 | 176.81 | 170.73 | 167.64 | 177.15 | 174.01 | 174.98 |
| Cycle 7 Adjusted Output | 13.92 | 18.78 | 50.29 | 50.43 | 30.17 | 43.16 | 62.58 | 24.52 | 36.10 | 38.07 | 22.40 | 39.17 |
| Cycle 7 Measured Temperature | 175.00 | 178.46 | 168.80 | 173.48 | 171.14 | 173.59 | 177.56 | 174.23 | 166.37 | 177.65 | 174.01 | 173.98 |
| Cycle 8 Adjusted Output | 13.92 | 18.70 | 50.60 | 50.51 | 30.36 | 43.23 | 62.43 | 24.52 | 36.53 | 37.94 | 22.40 | 39.22 |
| Cycle 8 Measured Temperature | 178.00 | 175.77 | 167.84 | 171.72 | 170.24 | 173.87 | 174.19 | 171.23 | 171.36 | 176.03 | 174.01 | 171.21 |
| Cycle 9 Adjusted Output | 13.77 | 18.70 | 50.96 | 50.68 | 30.60 | 43.28 | 62.43 | 24.70 | 36.71 | 37.89 | 22.40 | 39.41 |
| Cycle 9 Measured Temperature | 174.08 | 174.77 | 171.03 | 175.28 | 172.57 | 175.10 | 175.19 | 172.55 | 170.21 | 172.79 | 177.01 | 175.04 |
| Cycle 10 Adjusted Output | 13.77 | 18.70 | 51.16 | 50.68 | 30.72 | 43.28 | 62.43 | 24.83 | 36.95 | 38.00 | 22.30 | 39.41 |
| Cycle 10 Measured Temperature | 175.08 | 175.77 | 171.69 | 178.28 | 176.26 | 173.10 | 176.19 | 172.40 | 173.32 | 173.30 | 175.22 | 176.04 |

FIG. 6

FEEDBACK SYSTEM AND METHOD FOR AUTOMATICALLY ADJUSTING AND CONTROLLING INFRARED HEATING OF PARTS

FIELD OF THE INVENTION

The present disclosure relates generally to infrared heating systems and methods, and, more particularly, to feedback systems and methods for automatically controlling and adjusting infrared heating of parts to produce uniform heating of heated surfaces across multiple weld cycles.

BACKGROUND OF THE INVENTION

The invention pertains generally to infrared (IR) heaters. More specifically the invention relates to heaters used in the plastic welding industry to melt plastic components being welded together. While the use of infrared heaters for melting plastic is not a unique invention by itself, the addition of controlling the output to those heaters through a measurement of the part surface temperature is a concept that as never before been utilized in the industry of plastic welding.

A practical application of the surface temperature and infrared feedback adjustment system would be the welding of two halves of an automotive plastic intake manifold together.

Conventional setup for this weld process would include the user commanding output values to the IR heater. This results in a varying amount of energy transmitted to the part surface due to variance in heater functionality. Heater functionality variance comes in different forms such as a degradation as the heater ages or an increase in transmissivity as the heater warms up from continued use.

BRIEF SUMMARY

The present disclosure discloses a surface temperature and infrared feedback adjustment system for efficiently and directly controlling an infrared output for the next heating phase. The surface temperature and infrared feedback adjustment system utilizes sensors to monitor the surface temperature of the part. Using this method, the user inputs a desired surface temperature. The use of the control system has the advantage of allowing measurements of the part to adjust future control values to maintain a specific surface temperature that relates to the melting temperature of the plastic. Advantageously, the user does not have to manually adjust the heater output values based on current heater functionality variance.

The surface temperature and infrared feedback adjustment system generally includes sensors or cameras for measuring the surface temperature of the given part, infrared sources that impart heat to the surface of the part, and a controller that captures the measurements and manages the outputs to the infrared sources. The surface temperature and infrared feedback adjustment system takes a measurement of the part surface during or after the heating process and uses that measurement to adjust the controlled output for the infrared sources for the next heating phase.

The present disclosure also discloses a method of using a control loop to determine future values for infrared heater outputs based on readings of surface temperatures. Each output is controlled independently by a returned value from an array of datapoints in the sensor array.

According to an aspect of the present disclosure a system is disclosed to control outputs of infrared heaters used to join a first part to a second part. The system includes: an upper nest configured to hold the first part in a non-moving position relative to the upper nest; a lower nest opposite the upper nest and configured to hold the second part in a non-moving position relative to the lower nest; a movable heating platen having on an upper surface thereof a first plurality of infrared heaters configured to output infrared energy toward the upper nest in a welding cycle, the movable heating platen having on a lower surface thereof a second plurality of infrared heaters configured to output infrared energy toward the lower nest; a first imaging sensor arranged to have a field of view that encompasses heated portions of the first part in response to the movable heating platen being retracted away from an area between the upper nest and the lower nest; a second imaging sensor arranged to have a field of view that encompasses heated portions of the second part in response to the movable heating platen being retracted away from the area between the upper nest and the lower nest; and a controller configured to cause the upper nest with the first part to move in a direction toward the lower nest or to cause the lower nest with the second part to move in a direction toward the upper nest, to cause the movable heating platen to extend into and retract away from the area between the upper nest and the lower nest, to cause the first imaging sensor to take a first image of the heated portions of the first part, and to cause, responsive to the first imaging sensor taking the first image, an adjustment to an output of one or more of the first plurality of infrared heaters to be applied in a subsequent welding cycle.

The controller can be further configured to cause the second imaging sensor to take a second image of the heated portions of the second part, and, responsive thereto, cause an adjustment to an output of one or more of the second plurality of infrared heaters in a subsequent welding cycle. The first imaging sensor can be caused to take the first image responsive to the first imaging sensor's field of view being unimpeded by any portion of the movable heating platen as the movable heating platen retracts away from the area between the upper nest and the lower nest.

The controller can be further configured to: analyze a region of interest in the first image to determine a measured temperature in the region of interest corresponding to a first zone; compare the measured temperature to a target temperature to produce a comparison, and responsive to the comparison being greater than a predetermined acceptable deviation, causing the adjustment to not exceed a predetermined maximum adjustment to the output of the one or more of the first plurality of infrared heaters. The first imaging sensor can be caused to take the first image based on an expiration of a timer.

According to another aspect of the present disclosure, a method is disclosed of automatically adjusting outputs of infrared heaters used to join a first part to a second part. The method includes the steps of: holding the first part in an upper nest in a non-moving position relative to the upper nest; holding the second part in a lower nest opposite the upper nest in a non-moving position relative to the lower nest; moving a heated platen having on an upper surface thereof a first plurality of infrared heaters configured to output infrared energy into an area between the upper nest and the lower nest in a welding cycle, the heating platen having on a lower surface thereof a second plurality of infrared heaters configured to output infrared energy toward the lower nest; imaging using a first imaging sensor heated portions of the first part in response to the heating platen being retracted away from an area between the upper nest and the lower nest, the first imaging sensor being arranged to have a field of view that encompasses heated portions of the first part; imaging using a second imaging sensor heated portions of the second part in response to the heating platen being retracted away from the area between the upper nest and the lower nest, the second imaging sensor being arranged to have a field of view that encompasses heated portions of the second part; determining from the imaging using the first imaging sensor a temperature of the heated portions of the first part, and determining from the imaging using the second imaging sensor a temperature of the heated portions of the second part; rectracting the heating platen away from the area between the upper nest and the lower nest; responsive to the heating platen being retracted away from the area between the upper nest and the lower nest, and, responsive thereto, causing an adjustment to an output of one or more of the first plurality of infrared heaters to be applied in a subsequent welding cycle based on the determined temperatures.

The imaging the heated portions of the first part or the imaging the heated portions of the second part can be based on an expiration of a timer. The first imaging sensor can take the first image responsive to the field of view of the first imaging sensor being clear of the first plurality of infrared heaters on the upper surface of the heating platen, and wherein the second imaging sensor takes the second image responsive to the field of view of the second imaging sensor being clear of the second plurality of infrared heaters on the lower surface of the heating platen.

According to a further aspect of the present disclosure a component can be made using any system or method disclosed herein.

BRIEF DESCRIPTION OF THE DRAWINGS

The patent or application file contains at least one drawing executed in color. Copies of this patent application publication with color drawings will be provided by the Office upon request and payment of the necessary fee.

The present description will be understood more fully from the detailed description given below and from the accompanying drawings of various embodiments of the present embodiment, which, however, should not be taken to limit the present embodiment to the specific embodiments, but are for explanation and understanding only.

FIG. 6 is a table showing example temperature readings across twelve zones or regions of interest on the heated portions of the parts, and adjustments to the output of the infrared heaters made over 10 welding cycles.

DETAILED DESCRIPTION OF THE INVENTION

The disclosed systems and methods for measuring spectral absorption by objects will become better understood through a review of the following detailed description in conjunction with the figures. The detailed description and figures provide merely examples of the various embodiments described herein. Those skilled in the art will understand that the disclosed examples may be varied, modified, and altered without departing from the scope of the embodiments described herein. Many variations are contemplated for different applications and design considerations; however, for the sake of brevity, each and every contemplated variation is not individually described in the following detailed description.

Throughout the following detailed description, examples of various systems and methods for measuring spectral absorption are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1A:
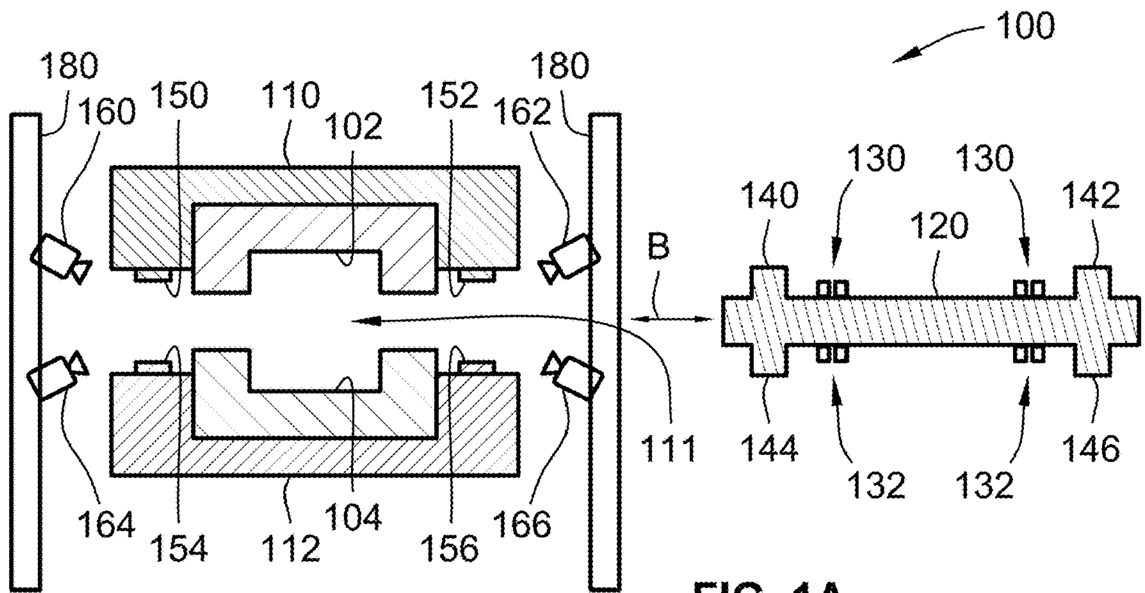
FIGS. 1A-1E illustrate different arrangements of the heating platen relative to nests holding parts and imaging sensors positioned to see the heated part after the heating platen retracts.

A surface temperature and infrared feedback adjustment system 100 controls outputs of infrared heaters used to join a first part 102 to a second part 104 (see FIG. 1A). The system 100 includes an upper nest 110 configured to hold the first part 102 in a non-moving or fixed position within or relative to the nest 110. A lower nest 112 opposite the upper nest 110 is configured to hold the second part 104 in a non-moving or position within or relative to the nest 112.

A movable heated or heating platen 120 having on an upper surface thereof a first set of infrared heaters 130 configured to output infrared energy toward the upper nest 110 in a welding cycle. The movable heating platen 120 has on a lower surface thereof a second set of infrared heaters 132 configured to output infrared energy toward the lower nest 112.

One or more first imaging sensors 160, 162 is/are arranged to have a respective field of view that encompasses or "sees" heated portions of the first part 102 in response to the movable heating platen 120 being retracted away from an area 111 between the upper nest 110 and the lower nest 112.

One or more second imaging sensors 164, 166 arranged to have a field of view that encompasses respective heated portions of the second part 104 in response to the movable heating platen 120 being retracted away from the area 11 between the upper nest 110 and the lower nest 112.

Figure 1C:
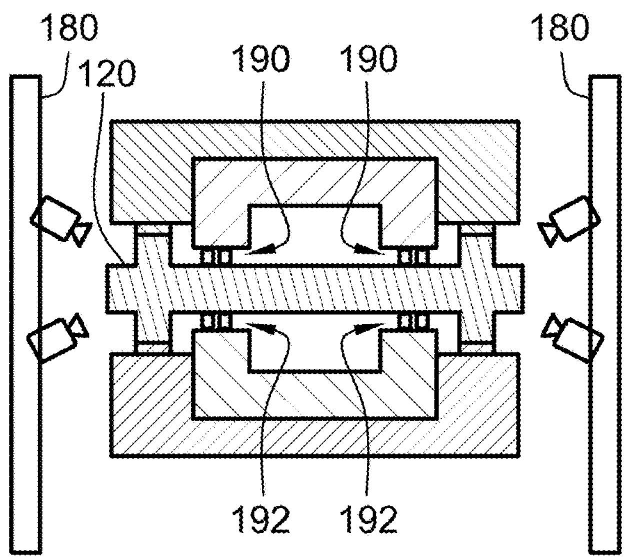
Figure 1E:
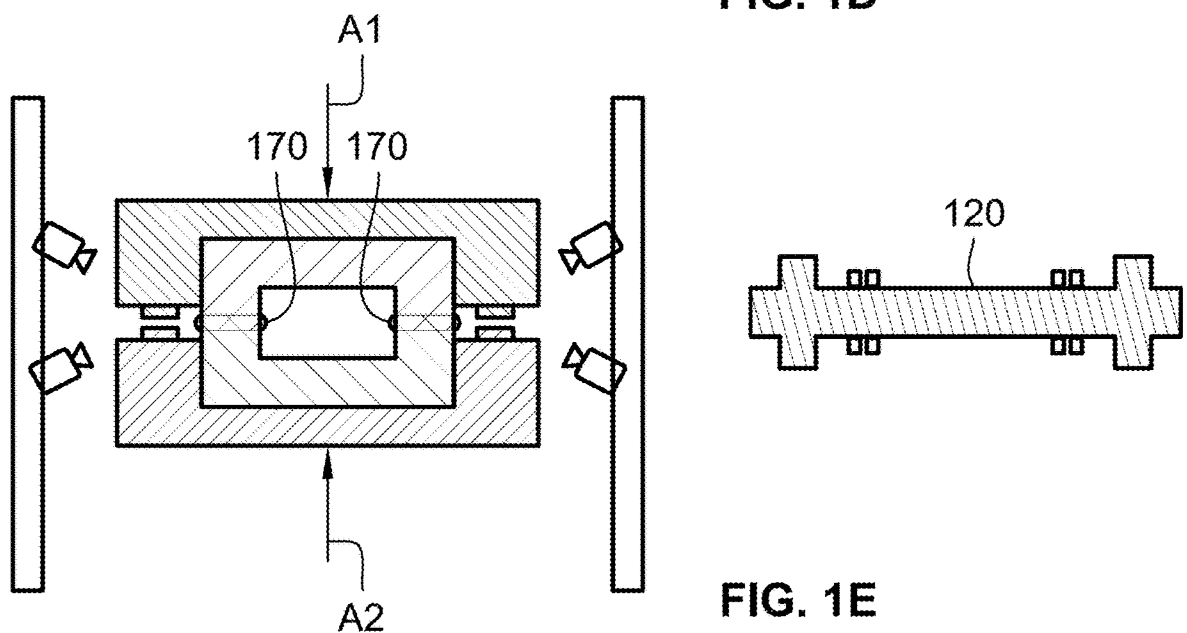
Figure 2:
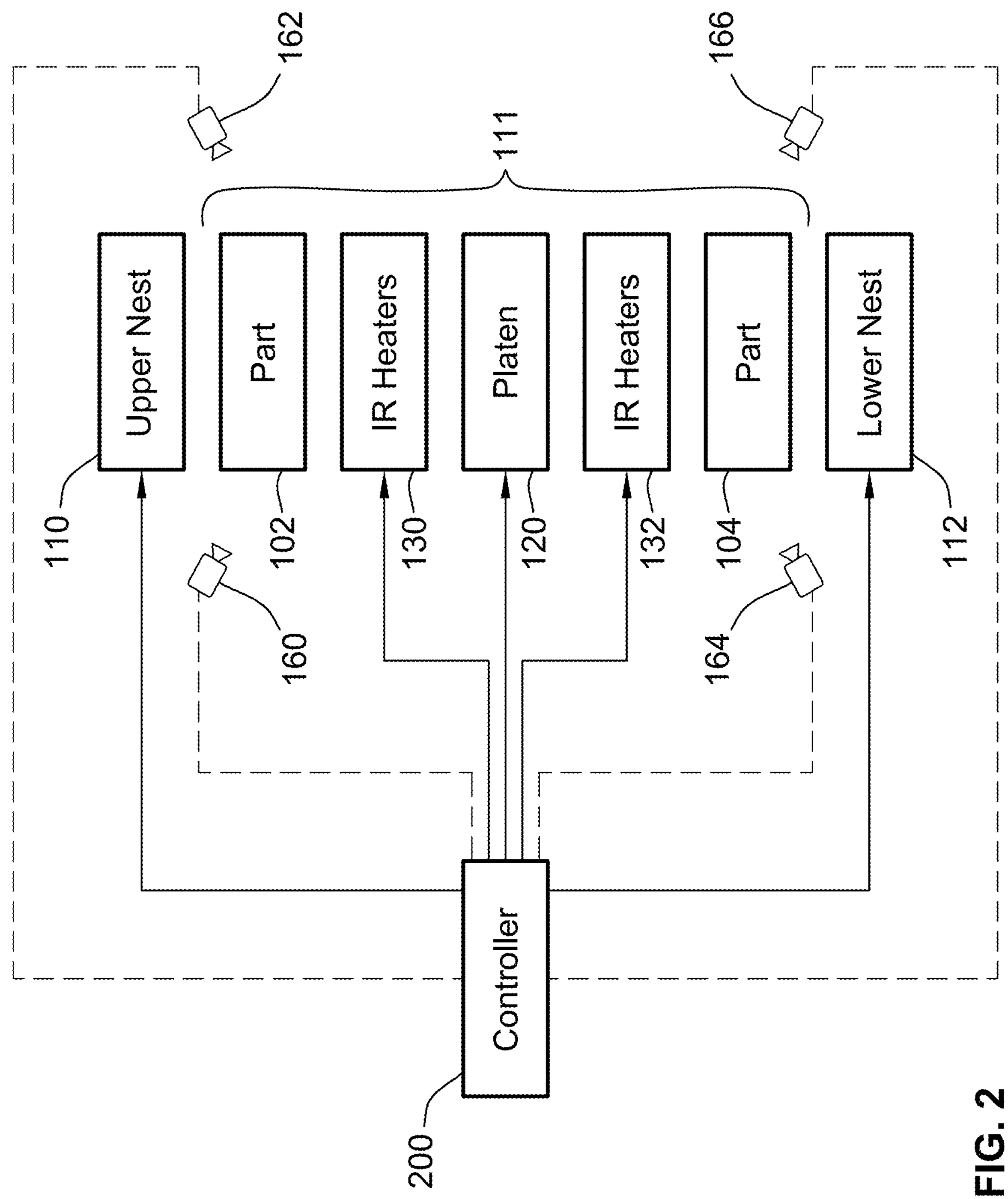
FIG. 2 is a functional block diagram of system 100 shown in FIGS. 1A-1E with the cameras positioned to see the heated parts after the heating platen retracts.

A controller 200 (FIG. 2) is configured to cause the upper nest 110 with the first part 102 to move in a direction, A1 (FIG. 1E), toward the lower nest 112 and to cause the lower nest 112 with the second part 104 to move in a direction, A2 (FIG. 1E), toward the upper nest 110, to cause the movable heating platen 120 to extend into and retract away from the area 111 between the upper nest 110 and the lower nest 112, to cause the one or more first imaging sensors 160, 162 to take a first image of the heated portions of the first part 102 and to cause, responsive thereto, an adjustment to an output of one or more of the first set of infrared heaters 130 to be applied in a subsequent welding cycle. The imaging sensors 160, 162, in this example, can be attached or mounted to a fixed frame 180. Alternately, the imaging sensors 160, 162 can be mounted on or incorporated in the upper nest 110. The upper and lower nests 110, 112 and the heating platen 120 are movable relative to the fixed frame 180. The upper nest 110 can include stops 150, 152, and the lower nest 112 can include stops 154, 156 to interface with corresponding features 140, 142, 144, 146 on the heating platen 120 when the heating platen 120 is positioned between the upper and lower nests 110, 112, such as shown in FIG. 1C.

The controller 200 is further configured to cause the second imaging sensors 164, 166 to take a second image of the heated portions of the second part 104, and, responsive thereto, cause an adjustment to an output of one or more of the second set of infrared heaters 132 in a subsequent welding cycle. The imaging sensors 164, 166 can be attached or mounted to the fixed frame 180, or, they can be mounted on or incorporated in the lower nest 112.

The first imaging sensors 160, 162 take the first image responsive to the field of view of the one or more first imaging sensors 160, 162 being unimpeded by any portion of the movable heating platen 120 as the movable heating platen 120 retracts away from the area between the upper nest 110 and the lower nest 112. Once the heating platen 120 is fully retracted away from the upper and lower nests 110, 112, they are brought together in the direction of arrows A1, A2 shown in FIG. 1E to join the parts 102, 104 at weld interfaces 170. The geometry of the parts 102, 104 can vary and the examplar shown in this disclosure is for ease of illustration and discussion. Those skilled in the art of infrared heating of parts will readily understand that any geometry of parts can be present using two or more nests, which act to hold the parts while portions of their surfaces they are being heated by the infrared heaters. Examples of parts include car engine parts and other complex geometries.

The controller 200 is further configured to analyze a region of interest in the first image to determine a measured temperature in the region of interest corresponding to a first zone. The controller 200 is further configured to compare the measured temperature to a target temperature to produce a comparison, and responsive to the comparison being greater than a predetermined acceptable deviation, causing the adjustment to not exceed a predetermined maximum adjustment to the output of the one or more of the first set of infrared heaters 130.

A method 500 (FIG. 5) of automatically adjusting outputs of infrared heaters used to join a first part to a second part is also disclosed. The method includes holding the first part 102 in an upper nest 110 in a fixed or non-moving position (relative to the upper nest 110), and holding the second part 104 in a lower nest 112 opposite the upper nest 110 in a fixed or non-moving position (relative to the lower nest 112). The upper and lower nests 110, 112 are optionally moved toward the parts 102, 104 to be joined (502). A heating platen 120 is moved between an area 111 between the upper and lower nests 110, 112 (504, FIGS. 1A, 1B, 1C, direction of arrow B1). As described above, the heating platen 120 has on an upper surface thereof a first set of infrared heaters 130 configured to output infrared energy toward the upper nest 110 in a welding cycle, and the heating platen 120 has on a lower surface thereof a second set of infrared heaters 132 configured to output infrared energy toward the lower nest 112. Infrared energy is applied to the parts 102, 104 by the respective sets of infrared heaters 130, 132 on the upper and lower surfaces of the heating platen 120 (506). The heating platen 120 is started to be retracted (508) as shown in FIGS. 1D and 1E (direction arrow B2). As the heating platen 120 retracts in the direction of arrow B2 (FIG. 1D), the imaging sensors 160, 164 will begin to have an unimpeded field of view of the respective upper and lower heated portions of the left sides of the first and second parts 102, 104. As the heating platen 120 continues to be retracted in the direction of arrow B2, the imaging sensors 162, 166 will also begin to have an unimpeded view of the respective upper and lower heated portions of the right sides of the first and second parts 102, 104. The timing of when the imaging sensors 160, 162, 164, 166 take the images can be a function of the position of the heating platen 120, or based on a timer, for example. The method 500 determines whether the imaging sensor 160, 162, 164, 166 has a clear field of view (510), and if not, any imaging sensor that does not have a clear field of view waits until the heating platen 120 retracts further. Once any imaging sensor 160, 162, 164, 166 has a clear field of view, or, alternately, once all imaging sensors 160, 162, 164, 66 have a clear field of view, the method 500 detects the surface temperatures of the heated areas on the parts 102, 104 (512). The surface temperature is determined by imaging using the imaging sensor 160, 162, 164, 166, which provides an indication of the temperature of the portions within its corresponding field of view. Importantly, compared to prior art systems, the time until join of parts 102, 104 is not extended because all images can be taken by the imaging sensors 160, 162, 164, 166 before the heating platen 120 fully retracts into a fully retracted position shown in FIG. 1E.

The method 500 analyzes regions of interest using the determined surface temperatures of the heated portions on the parts 102, 104, and based on the analysis, causes an adjustment to an output of one or more of the first plurality of infrared heaters to be applied in a subsequent welding cycle (514). The first and second parts 102, 104 can form part of a component, which can be composed of a plastic material.

Figure 3:
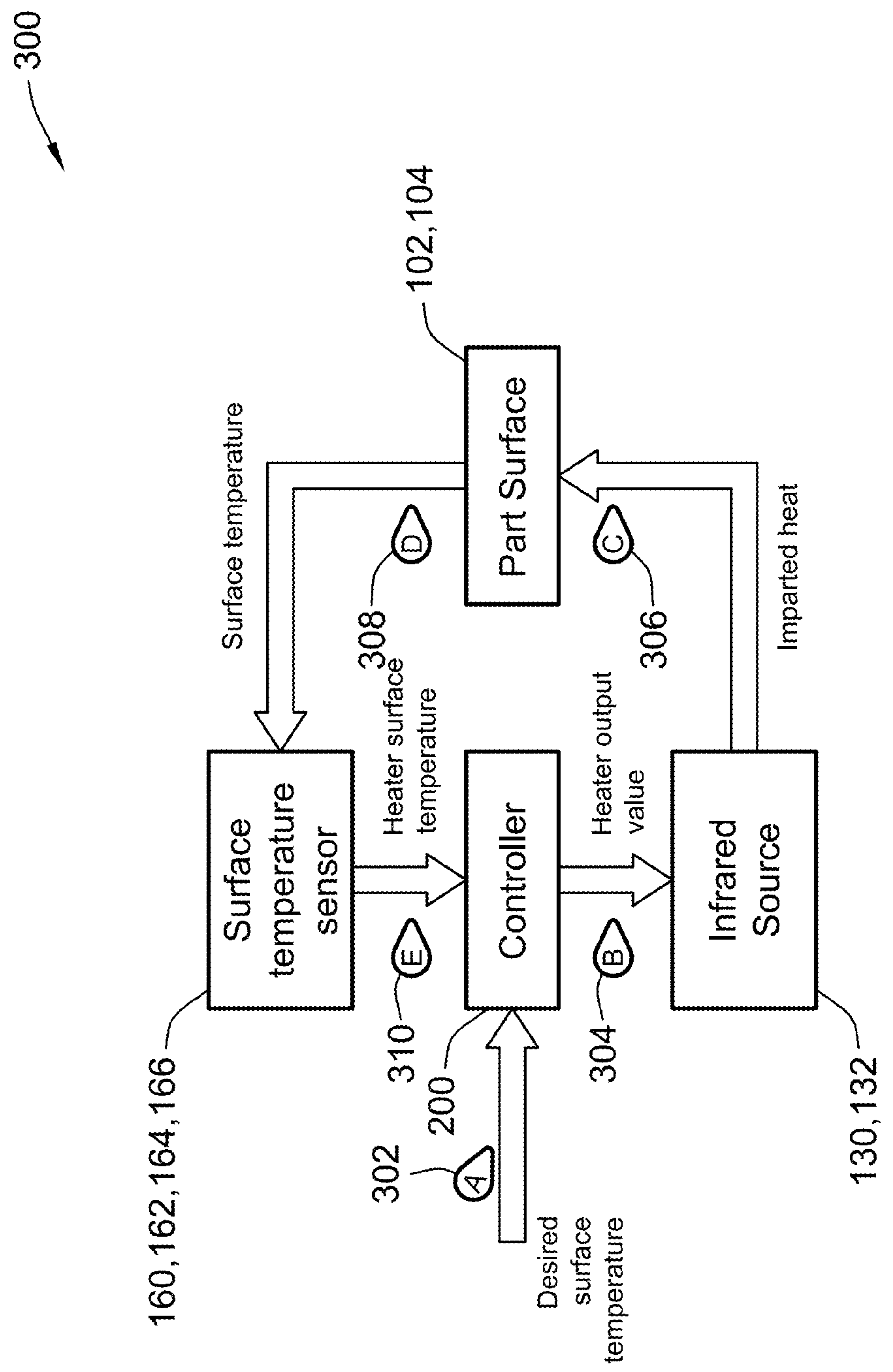
FIG. 3 depicts the control loop used to determine the output for each heating cycle per zone of the system
Figure 4A:
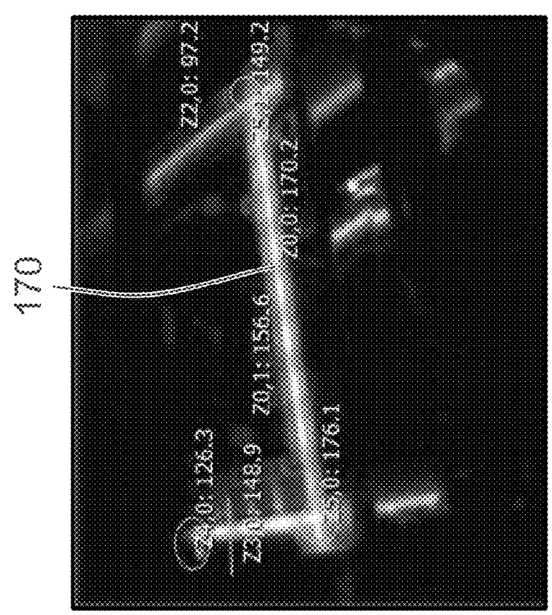
FIGS. 4A-4D depict the sensed part and the heated zones or regions of interest along the weld bead of the part. These regions of interest relate to the various controlled zones of the system.
Figure 4B:
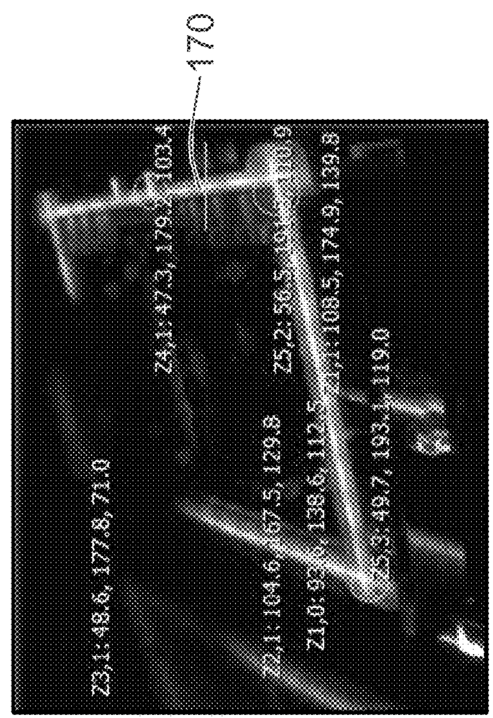
Figure 4C:
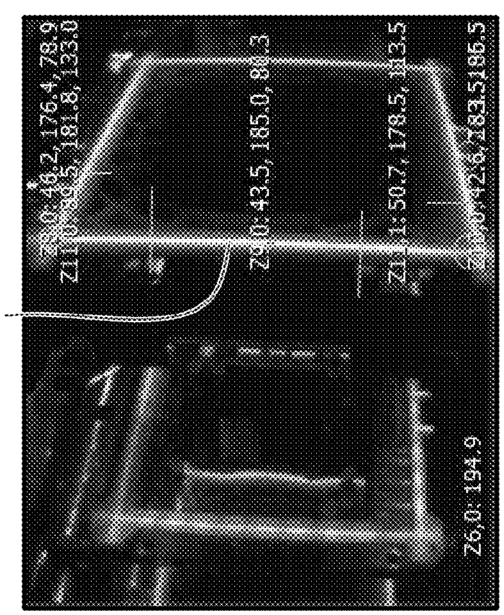
Figure 4D:
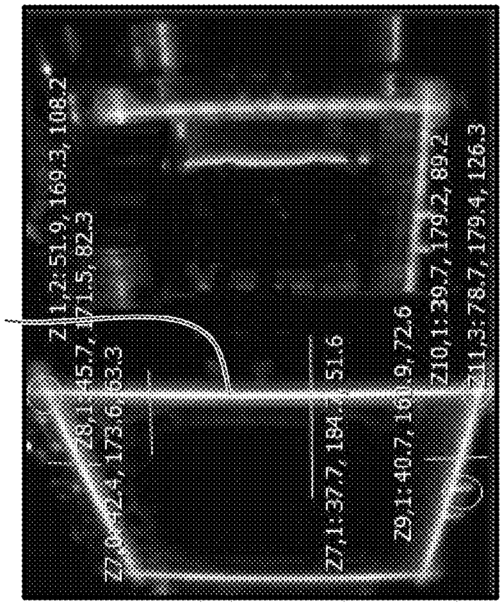

A control loop of adjusting infrared heater outputs based on measured temperatures by the imaging sensors is described in connection with FIG. 3. A user inputs to the controller 200 a desired surface temperature for the first/second part 102, 104 (302). A previously determined output value is used to run the heating cycle (304). During the heating cycle, one or more infrared sources or heaters 130, 132 impart a heat via infrared energy to the surface of the first/second part 102, 104 (306). A surface temperature sensor or camera 160, 162, 164, 166 can be used as an imaging sensor to determine the heated surface temperature prior to joining (308). The heated surface temperature is inputted to the controller 200 (310). The controller 200 compares the heated surface temperature to the desired surface temperature and determines the next output value for the following heating cycle (304).

The surface temperatures can be generally monitored using zones or regions of interest as shown in FIGS. 4A-4D. The regions of interest around the circumference of the part 102, 104 are monitoring the surface temperature and are used to adjust the temperature in the individual zones for a subsequent weld. Due to the varying temperatures across the part 102, 104 as a whole, individual zone control is important to the reliability of the weld. The number and size of zones and regions of interest per zone range per application. Table 6 shown in FIG. 6 shows 12 zones or regions of interest 170 whose temperature is monitored by one or more imaging sensors 160, 162, 164, 166. In FIGS. 4A-4D, the zones are labeled Z0, Z1, Z2, and so forth, and the values indicate the temperature detected by the imaging sensor 160, 162, 164, 166 following at least partial retraction of the heating platen 120.

The methods according to present disclosure can also assist in setting up a new part for infrared heating. Conventionally, a user must make guesses as to infrared heater powers for the melting until the user sees an optimum result. Using the methods 500 disclosed herein, the system 100 will take the desired surface temperature of heated portions of the parts and automatically adjust the infrared heater outputs to the new part in just a few test cycles.

The temperature of each measured zone is not a parameter that is steady especially when measured from one cycle to the next. A minimum of one, two, or three measurements can be taken along each zone. These one or more measurements take the maximum temperature in specific regions of interest and then averages across the different measured temperatures to arrive at the measured temperature of the zone.

Figure 1B:
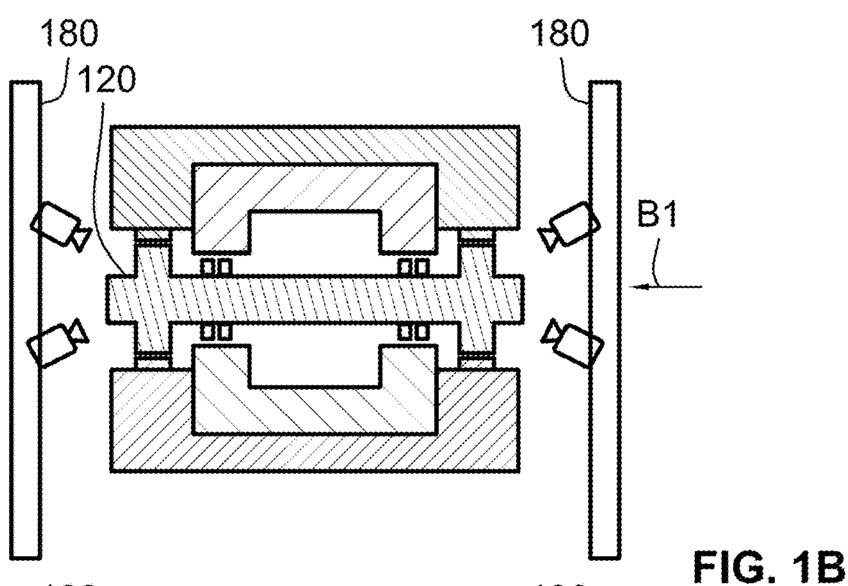
Figure 1D:
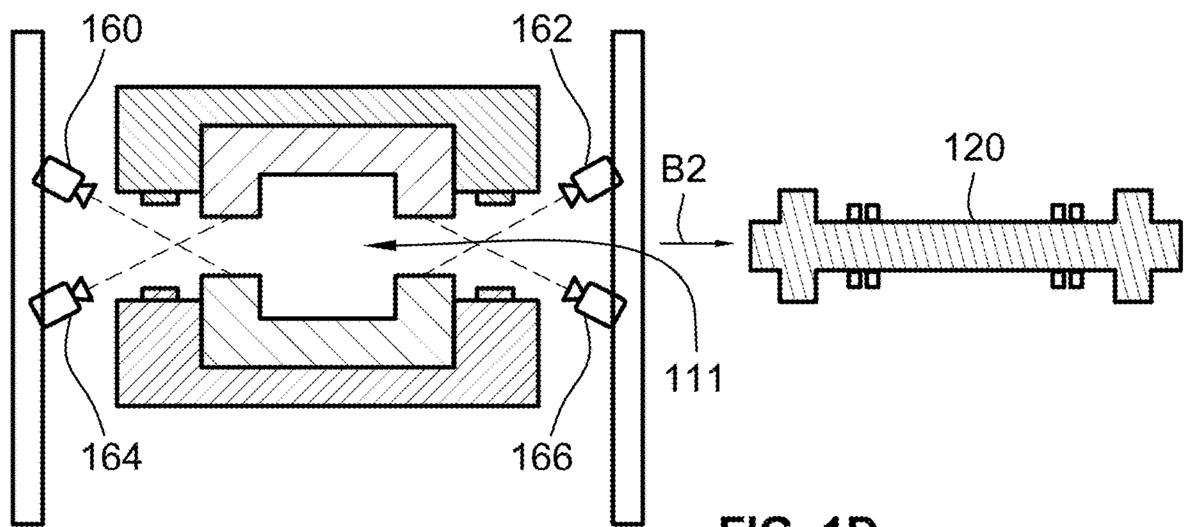

The steps for this system are critical between the heating and the joining of the upper and lower parts because any time wasted before the join after the heat is applied, the parts begin to start cooling. As a result, the system 100 can be designed to allow for the temperature reading in a way that minimally affects the timing of the join (when the respective heated portions of the parts 102, 104 are joined together). In the example system 100 in FIG. 1A-1E, there are four IR cameras 160, 162, 164, 166 placed in such a way that when the heating platen 120 retracts, the system 100 can take pictures of the upper and lower parts 102, 104. According to an aspect of the present disclosure, the following steps can be performed:

The heating platen 120 extends (FIG. 1A to FIG. 1B)

The upper and lower nests 110, 112 move to their heating position (FIGS. 1B to FIG. 1C).

The heating process is applied using the current output values for each individual zone (FIG. 1C).

The upper and lower nests 110, 112 move to a position such that the cameras have within their field of view the heated portions of the upper and lower parts 102, 104 when the heating platen 120 retracts (FIG. 1D).

Once the upper and lower nests 110, 112 are out of the way such that they will not make contact with a retracting heating platen 120 the heating platen begins to retract 120 (FIG. 1D).

When the upper and lower nests 110, 112 are in the imaging position and the heating platen 120 is in a position that it is no longer obscuring the view of the imaging sensors 160, 162, 164, 166 of the heated portions of the upper and lower parts 102, 104, the imaging sensors 160, 162, 164, 166 take a snapshot image of the upper and lower parts.

The upper and lower nest come together to the join position (FIG. 1E).

Figure 5:
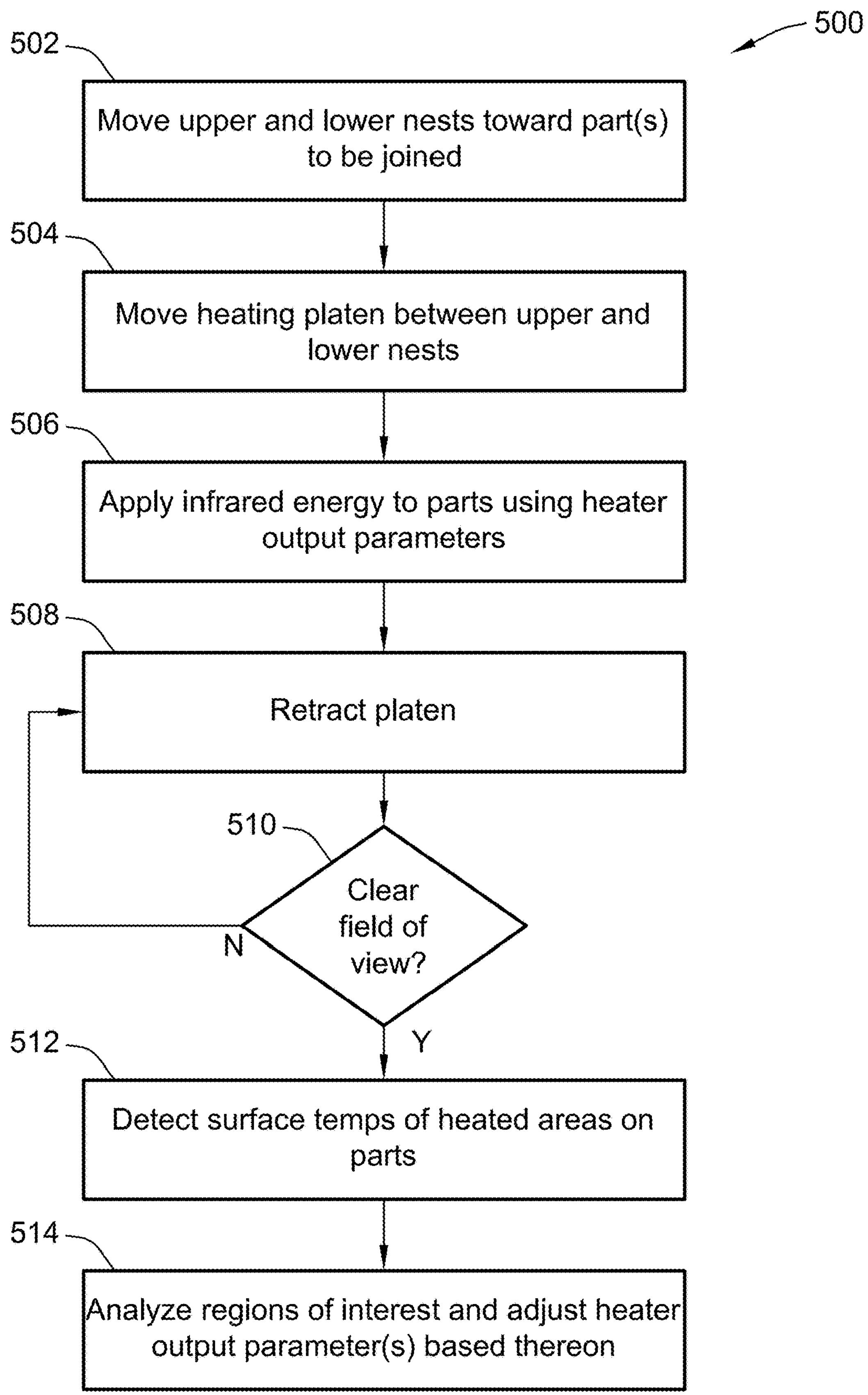
FIG. 5 is a flowchart of an example method automatically adjusting outputs of infrared heaters used to join a first part to a second part according to an aspect of the present disclosure.

The snapshot taken can be analyzed for the temperature of each zone (e.g., 12 zones, see FIG. 6) and then used to determine the next output value for each zone (FIG. 5, 514).

The snapshot analysis can be calculated based on the difference between the measured and target temperatures for each zone. An example of such a calculation is as follows. First, the controller 200 checks if the measured temperature is less than one degree from the target temperature (e.g., 175 degrees). If so, the next output for that zone is the same as this cycle. Next, the controller 200 checks to see if the measured temperature is less than 10 degrees from the target temperature. If so the next output is generated by the equation: AdjustedOutput=CurrentOutput+((TargetTemperature−MeasuredTemperature)*0.05).

If the difference is above this value, the controller 200 generates the output by the equation: AdjustedOutput=CurrentOutput ((TargetTemperature MeasuredTemperature)*0.01).

Finally, the controller 200 takes the AdjustedOutput value and can optionally perform limiting checks. The output value can stay from 0-100 and have a delta of no more than + or −5. This AdjustedOutput is then used by the controller 200 for the control of the specified zone (for the given infared heater 130, 132) for the next cycle. An example of 12 zones running using this example system can be seen in FIG. 6. The table in FIG. 6 shows an example of a simulated response across twelve zones and ten cycles with each zone having a target temperature of 175 degrees.

The disclosure above encompasses multiple distinct embodiments with independent utility. While each of these embodiments has been disclosed in a particular form, the specific embodiments disclosed and illustrated above are not to be considered in a limiting sense as numerous variations are possible. The subject matter of the embodiments includes all novel and non-obvious combinations and sub-combinations of the various elements, features, functions and/or properties disclosed above and inherent to those skilled in the art pertaining to such embodiments. Where the disclosure or subsequently filed claims recite “a” element, “a first” element, or any such equivalent term, the disclosure or claims should be understood to incorporate one or more such elements, neither requiring nor excluding two or more such elements.

Applicant(s) reserves the right to submit claims directed to combinations and sub-combinations of the disclosed embodiments that are believed to be novel and non-obvious. Embodiments embodied in other combinations and sub-combinations of features, functions, elements and/or properties may be claimed through amendment of those claims or presentation of new claims in the present application or in a related application. Such amended or new claims, whether they are directed to the same embodiment or a different embodiment and whether they are different, broader, narrower or equal in scope to the original claims, are to be considered within the subject matter of the embodiments described herein.

What is claimed is:

1. A system to control outputs of infrared heaters used to join a first part to a second part, the system comprising:

an upper nest configured to hold the first part in a non-moving position relative to the upper nest;

a lower nest opposite the upper nest and configured to hold the second part in a non-moving position relative to the lower nest;

a movable heating platen having on an upper surface thereof a first plurality of infrared heaters configured to output infrared energy toward the upper nest in a welding cycle, the movable heating platen having on a lower surface thereof a second plurality of infrared heaters configured to output infrared energy toward the lower nest;

a first imaging sensor arranged to have a field of view that encompasses heated portions of the first part in response to the movable heating platen being retracted away from an area between the upper nest and the lower nest;

a second imaging sensor arranged to have a field of view that encompasses heated portions of the second part in response to the movable heating platen being retracted away from the area between the upper nest and the lower nest; and a controller configured to:

cause the upper nest with the first part to move in a direction toward the lower nest or to cause the lower nest with the second part to move in a direction toward the upper nest such that the upper nest and lower nest are in a heating position, cause the movable heating platen to extend into the area between the upper nest and the lower nest to initiate the welding cycle by applying infrared heat, subsequent to initiating the welding cycle, cause the upper nest and the lower nest to move to an imaging position, subsequent to causing the upper nest and lower next to move to the imaging position, cause the movable heating platen to retract away from the area between the upper nest and the lower nest towards a fully retracted position, cause the first imaging sensor to take a first image of the heated portions of the first part and the second imaging sensor to take a second image of the heated portions of the second part responsive to the fields of view of the first imaging sensor and the second imaging sensor being unimpeded by any portion of the movable heating platen as the moveable heating platen retracts away from the area between the upper nest and the lower nest and prior to the moveable heating platen reaching the fully retracted position, subsequent to causing the first imaging sensor to take the first image and the second imaging sensor to take the second image, cause the upper nest, the lower nest, or both to move to join the heated portions of the first part and the heated portions of the second part to end the welding cycle, and cause, responsive to the first imaging sensor taking the first image and the second imaging sensor taking the second image, an adjustment to an output of one or more of the first plurality of infrared heaters to be applied in a subsequent welding cycle.

2. The system of claim 1, wherein the controller is further configured to:

analyze a region of interest in the first image to determine a measured temperature in the region of interest corresponding to a first zone;

compare the measured temperature to a target temperature to produce a comparison, and responsive to the comparison being greater than a predetermined acceptable deviation, causing the adjustment to not exceed a predetermined maximum adjustment to the output of the one or more of the first plurality of infrared heaters.

3. The system of claim 1, wherein the first imaging sensor is caused to take the first image based on an expiration of a timer.

4. The system of claim 2, wherein the output of the one or more of the first plurality of infrared heaters is a value between 0 and 100.

5. The system of claim 4, wherein the predetermined maximum adjustment to the output of the one or more of the first plurality of infrared heaters is ±5.

6. The system of claim 1, wherein the controller is further configured to:

analyze a first zone of a plurality of zones in the first image to determine a measured temperature in the first zone;

compare the measured temperature of the first zone to a target temperature;

responsive to the measured temperature of the first zone being less than 10 degrees from the target temperature, determining an adjusted output of the one or more of the first plurality of infrared heaters for the subsequent welding cycle.

* * * * *